US008239457B1

(12) United States Patent
Laumen et al.

(10) Patent No.: US 8,239,457 B1
(45) Date of Patent: Aug. 7, 2012

(54) METHOD FOR TRANSMISSION OF AN ELECTRONIC POST MESSAGE

(75) Inventors: Josef Laumen, Hildesheim (DE); Gunnar Schmidt, Wolfenbuettel (DE)

(73) Assignee: IPCOM GmbH & Co. KG, Pullach (DE)

( * ) Notice: Subject to any disclaimer, the term of this patent is extended or adjusted under 35 U.S.C. 154(b) by 786 days.

(21) Appl. No.: 10/168,158

(22) PCT Filed: Nov. 14, 2000

(86) PCT No.: PCT/DE00/04025
§ 371 (c)(1), (2), (4) Date: Oct. 2, 2002

(87) PCT Pub. No.: WO01/45320
PCT Pub. Date: Jun. 21, 2001

(30) Foreign Application Priority Data

Dec. 17, 1999 (DE) .................................. 199 61 345

(51) Int. Cl.
*G06F 15/16* (2006.01)
(52) U.S. Cl. ........................................ 709/206; 709/236
(58) Field of Classification Search ................ 709/206, 709/236; 455/466; 370/349, 389, 392, 398
See application file for complete search history.

(56) References Cited

U.S. PATENT DOCUMENTS

| 5,446,736 | A | | 8/1995 | Gleeson et al. |
| 5,487,100 | A | * | 1/1996 | Kane ............................ 340/7.23 |
| 5,706,434 | A | | 1/1998 | Kremen et al. |
| 5,878,397 | A | * | 3/1999 | Stille et al. ...................... 455/466 |
| 5,903,726 | A | * | 5/1999 | Donovan et al. ............... 709/206 |
| 5,946,629 | A | * | 8/1999 | Sawyer et al. .................. 455/466 |
| 6,061,718 | A | * | 5/2000 | Nelson ............................ 709/206 |
| 6,097,961 | A | | 8/2000 | Alanara et al. |
| 6,175,743 | B1 | * | 1/2001 | Alperovich et al. ........... 455/466 |
| 6,178,331 | B1 | | 1/2001 | Holmes et al. |
| 6,205,330 | B1 | * | 3/2001 | Winbladh .................... 455/426.1 |
| 6,249,808 | B1 | * | 6/2001 | Seshadri ........................ 709/206 |
| 6,334,142 | B1 | * | 12/2001 | Newton et al. ................. 709/206 |
| 6,424,828 | B1 | * | 7/2002 | Collins et al. ............... 455/412.1 |
| 6,519,234 | B1 | | 2/2003 | Werkander |

(Continued)

FOREIGN PATENT DOCUMENTS

DE 298 16 131 1/1999

(Continued)

OTHER PUBLICATIONS

RFC #822, Standard for the format of ARPA Internet text messages, Revised by David H. Crocker, Aug. 13, 1982.*

(Continued)

*Primary Examiner* — Patrice Winder
*Assistant Examiner* — Benjamin Ailes
(74) *Attorney, Agent, or Firm* — Kenyon & Kenyon LLP

(57) ABSTRACT

A method of transmitting electronic mail messages using the least possible data capacity. It uses a short message service, an electronic mail message and address and/or identification data for transmission of the electronic mail message in a second communications network is transmitted with a short message in a first communications network. A first header including signaling of at least one data field, including the address and/or identification data, is transmitted with the short message. A second header, indicating the presence of the first header, is transmitted with the short message. The at least one data field is transmitted outside of any header within a data portion of the short message.

29 Claims, 2 Drawing Sheets

U.S. PATENT DOCUMENTS

| | | | |
|---|---|---|---|
| 6,535,586 B1 | | 3/2003 | Cloutier et al. |
| 6,603,974 B1 | * | 8/2003 | Rollender ..................... 455/445 |
| 6,847,632 B1 | * | 1/2005 | Lee et al. ...................... 370/352 |
| 7,069,335 B1 | * | 6/2006 | Layman et al. ............... 709/238 |
| 7,894,832 B1 | * | 2/2011 | Fischer et al. ................ 455/466 |
| 8,023,973 B2 | * | 9/2011 | Wiatrowski et al. .......... 455/466 |
| 2009/0082044 A1 | * | 3/2009 | Okuyama et al. ............. 455/466 |

FOREIGN PATENT DOCUMENTS

| | | |
|---|---|---|
| DE | 199 59 528 | 6/2001 |
| EP | 0 777 394 | 6/1997 |
| EP | 1 240 758 | 8/2000 |
| EP | 1 243 107 | 9/2002 |
| EP | 1 256 241 | 11/2002 |
| EP | 1 243 107 | 7/2006 |
| WO | WO 98/56195 | 12/1998 |
| WO | WO 99 52247 | 10/1999 |

OTHER PUBLICATIONS

ETSI TS 100901 Digital Cellular Telecommunications System (Phase 2+): Technical Realization of the Short Message Service (SMS): Point-to-Point (PP), GSM 03.40 version 7.3.0 Release 1998, ETSI Specification, Nov. 1999.
SMS-E-Mail Parameter, T2(99)-1068 Change Request to 23.040, Nov. 23, 1999.
Technical Realization of the Short Message Service (SMS): Point-to-Point (PP), GSM 03.40 V7.1.0 (Nov. 1998).
Technical Realization of the Short Message Service (SMS): Point-to-Point (PP), 3G 23.040 V3.2.0 (Oct. 1999).
Standard for the Format of ARPA Internet Text Messages, IETF, RFC 822, Aug. 13, 1982.
Alphabets and Language-Specific Information, GSM 03.38 version 7.2.0 Release 1998 (Jul. 1999).
Alphabets and Language-Specific Information, 3GPP 23.038 version 5.0.0 Release 5 (Mar. 2002).
*SMS E-Mail Parameters, T2(99)-1068 Change Request to 23.040*, 3GPP Meeting T2 No. 7, ETSI SMG4, Nov. 22, 1999, pp. 1-5.
Global System for Mobile Communications Digital Cellular Telecommunications System (Phase 2+), Technical Realization of the Short Message Service (SMS), Point-to-Point (PP), Nov. 1999, (gsm 03.40 version 7.3.0 Release 1998), ETSI TS, XP002168377.
Martini G. et al., Distributed Architecture for Applications Based on the GSM Short Message Service, Jun. 5, 1995, pp. 140-145, International Workshop on Services in Distributed and Networked Environments.
Collesi S. et al., SMS based applications for GSM Networks, Jun. 1, 1995, Technical Reports vol. 23, No. 3—CSELT, Turin, IT.
Computer Networks, Andrew S. Tanenbaum, Third Edition, EP1243107 Exhibit K4.
ETSI IPR Policy, Extracted from the ETSI Rules of Procedure, Nov. 22, 2000, EP1243107 Exhibit K8b.
T2#7/SMG4 Report V 1.0 (Feb. 2000) $3^{rd}$ Generation Partnership Project (3GPP); Technical Specification Group Terminals (TSG-T); Working Group 2 Mobile Terminal Services and Capabilities Meeting Report T2#7/SMG4, Ystad, Sweden, Nov. 22-26, 1999.
European digital cellular telecommunications system (Phase 2); Technical realization of the Short Message System (SMS) Point-to-Point (PP) (GSM 03.40), K5a, Aug. 1995.
Technical Specification GSM 03.40, version 5.6.0, K5b, Nov. 1997.
Report of the SMG4 meeting #3/97, K5c, Nov. 1997.
Technical Specification GSM 03.40, version 5.6.0, K5d, Nov. 1997.
3GPP TSG T WG2 SWG3 Archives, K7a, Dec. 1999.
3rd Generation Partnership Project (3GPP); Technical Specification Group Terminals (TSG-T); Working Group 2 Mobile Terminal Services and Capabilities; Draft meeting Report, version 0.0.3, K7b, Feb. 1999.
3rd Generation Partnership Project (3GPP); Technical Specification Group Terminals (TSG-T); Working Group 2 Mobile Terminal Services and Capabilities; Meeting Report, version 1.0, K7c, Sep. 1999.
3rd Generation Partnership Project (3GPP); Technical Specification Group Terminals (TSG-T); Working Group 2 Mobile Terminal Services and Capabilities; Meeting Report, version 1.0, K7d, Jun. 1999.
3rd Generation Partnership Project (3GPP); Technical Specification Group Terminals (TSG-T); Working Group 2 Mobile Terminal Services and Capabilities; Meeting Report, version 1.0, K7e, Sep. 1999.
SIM Toolkit Secure Messaging; GSM 03.48, version 1.3.0, K11, Nov. 1997.
Digital cellular telecommunications system (Phase 2+); SIM Toolkit Secure Messaging GSM Release 1997, GSM 03.48, version 1.2.0, K11a, Nov. 1997.
Standard for the Format of ARPA Internet Text Messages, K12, Aug. 13, 1982.
3rd Generation Partnership Project (3GPP); Technical Specification Group Terminals; Technical realization of the Short Message Service (SMS); Point-to-Point (PP), 3G TS 23.040 version 3.2.0, Oct. 1999.
Khare, R. "W* Effect Considered Harmful" IEEE Internet Computing Jul./Aug. 1999.
"ATM Theory and Application," McDysan and Spohn, 1999.
3rd Generation Partnership Project (3G TS 23.140 version 0.1.0) Oct. 1999.
ETSI TS Digital Cellular Communications System (Phase 2+) (GSM 03.40 version 7.2.0) Jul. 1999.
WAP Binary XML Content Format, W3C Note 24, Jun. 1999.
GSM 03.40 version 5.0.0 Dec. 1995.
WAP Service Indication version Nov. 8, 1999.

* cited by examiner

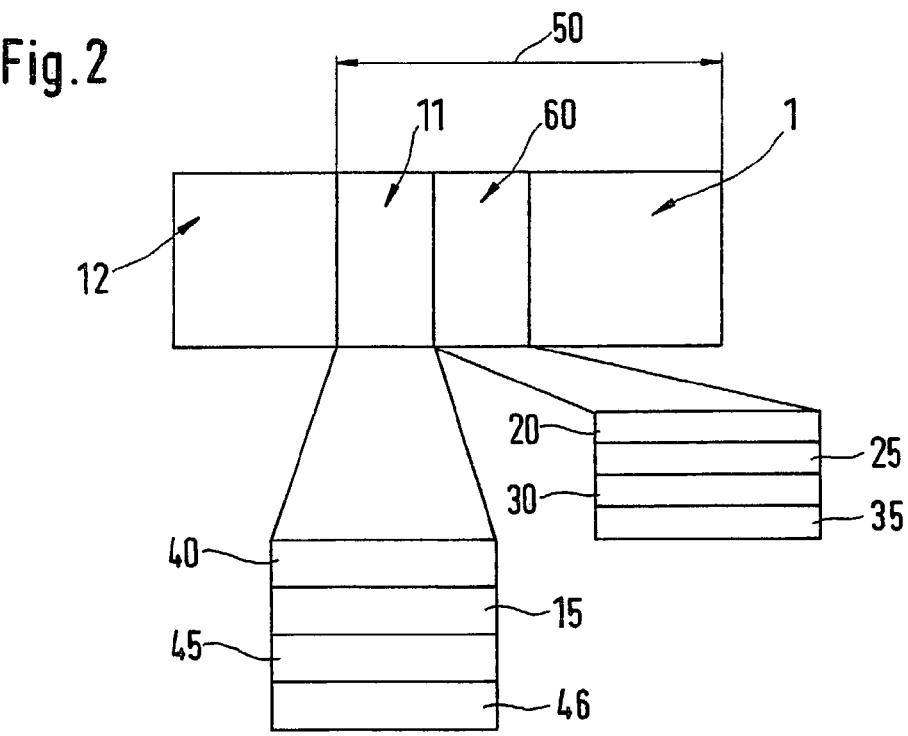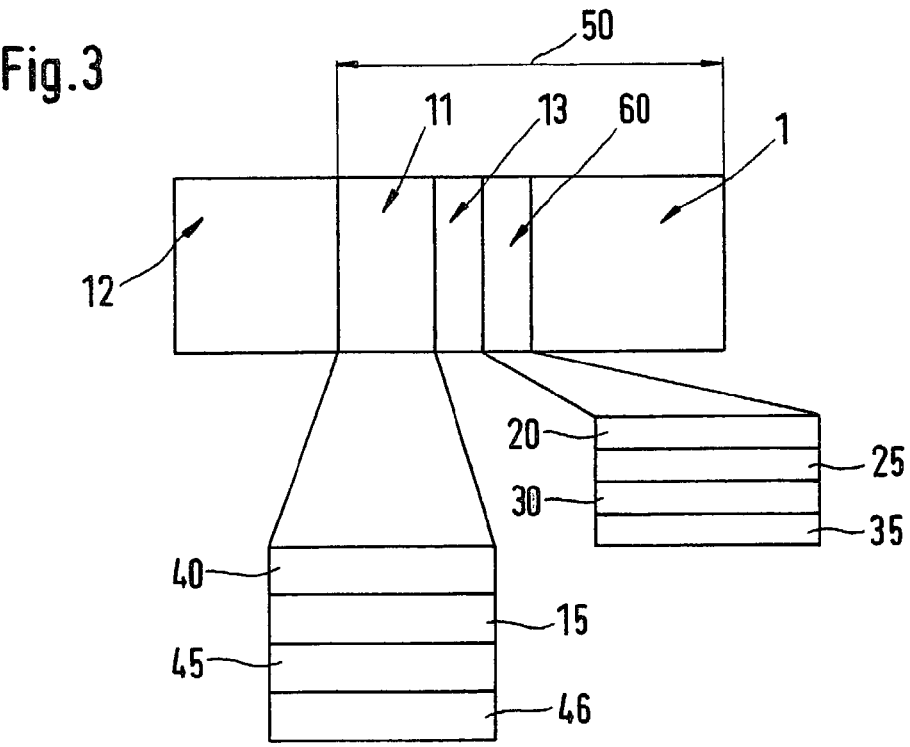

METHOD FOR TRANSMISSION OF AN ELECTRONIC POST MESSAGE

FIELD OF THE INVENTION

The present invention relates to a method of transmitting electronic mail messages.

BACKGROUND INFORMATION

The publications "Technical realization of the Short Message Service (SMS): Point-to-Point (PP)," GSM 03.40 V7.1.0 (1998-11) and 3G 23.040 V3.2.0 (1999-10) discuss a method of transmitting Internet e-mail by using the SMS short message service, in which an Internet e-mail as well as address and identification data for transmission of Internet e-mail are transmitted over the Internet with an SMS short message in a telecommunications network. The standard according to these publications provides for the possibility of sending and receiving Internet e-mail over the short message service SMS. To send a message, a signaling entry PID (protocol identifier) must be set accordingly in a header of the SMS short message to indicate the Internet e-mail transmitted with the short message. The data portion of the SMS short message begins with the destination address for the Internet e-mail. When receiving Internet e-mail over the SMS short message service, the destination address has been replaced by a network unit with the source address of the sender. The separation between the Internet e-mail destination address or source address and the actual Internet e-mail in the SMS short message is simply a blank character.

Optionally the standard according to the publications cited supports multiple destination addresses, which must be separated by commas, as well as the data fields "subject" to indicate the title of the Internet e-mail and "real name" to indicate the actual name of the sender. As a separation character between these data fields, the "subject" data field is put in parentheses or designated by two preceding special characters, such as "##." The "real name" data field is designated by a special character, such as "#."

SUMMARY OF THE INVENTION

The exemplary method according to the present invention for transmitting electronic mail messages provides for a first header including signaling of at least one data field is transmitted with the short message, this data field including the address and/or identification data; a second header is transmitted with the short message, indicating the presence of the first header, and the at least one data field within a data portion of the short message is transmitted outside each header. In this manner, a first service provider of the first communications network may relay the short message to a second service provider of the second communications network as a function of an analysis of the second header information, and the second communications network may then perform another analysis of the short message on the basis of the first header information to extract the electronic mail message from the short message and to relay the electronic mail message via the second communications network. Thus it is not necessary for the first service provider of the first communications network to simultaneously be the service provider of the second communications network.

In addition, a special form of address of the electronic mail message may be referenced by the first header and may be taken into account when the electronic mail message is extracted by the second service provider. The form of address may be selected flexibly. The only prerequisite is that the second service provider must know the respective specified form of address of the electronic mail message and thus is able to analyze it for extraction and relaying the electronic mail message.

At least one data field is identified by a keyword for transmission in the first header. Thus multiple data fields are unambiguously differentiated with little effort.

The keyword is transmitted in coded form. This minimizes the negative effect on the data capacity of the short message due to transmission of one or more keywords.

An identifying data field which indicates the form of the address and/or identification data is transmitted with the first header. This guarantees an error-free analysis of the at least one data field in the second service provider, so that the electronic mail message contained in the short message may be transmitted to the correct receiver(s) in the second communications network.

At least one third header is transmitted with the short message, identifying the electronic mail message as part if a complete electronic mail message concatenated by transmission of multiple short messages. In this manner, in the case of short messages limited to a given data volume in particular, an electronic mail message which exceeds the given data volume is nevertheless sent by concatenation of a plurality of short messages in the first communications network, so the electronic mail messages of the short messages which have been concatenated are combined via the at least one third header to form a complete electronic mail message in the second service provider and it is sent to at least one second destination address indicated in a data field.

Exemplary embodiments of the present invention are illustrated in the drawings and explained in greater detail in the following description.

BRIEF DESCRIPTION OF THE DRAWINGS

FIG. 2 shows a first example of a schematic diagram of a short message including an integrated electronic mail message.

FIG. 3 shows a second example of a schematic diagram of a short message including an integrated electronic mail message.

DETAILED DESCRIPTION

Figure 1:
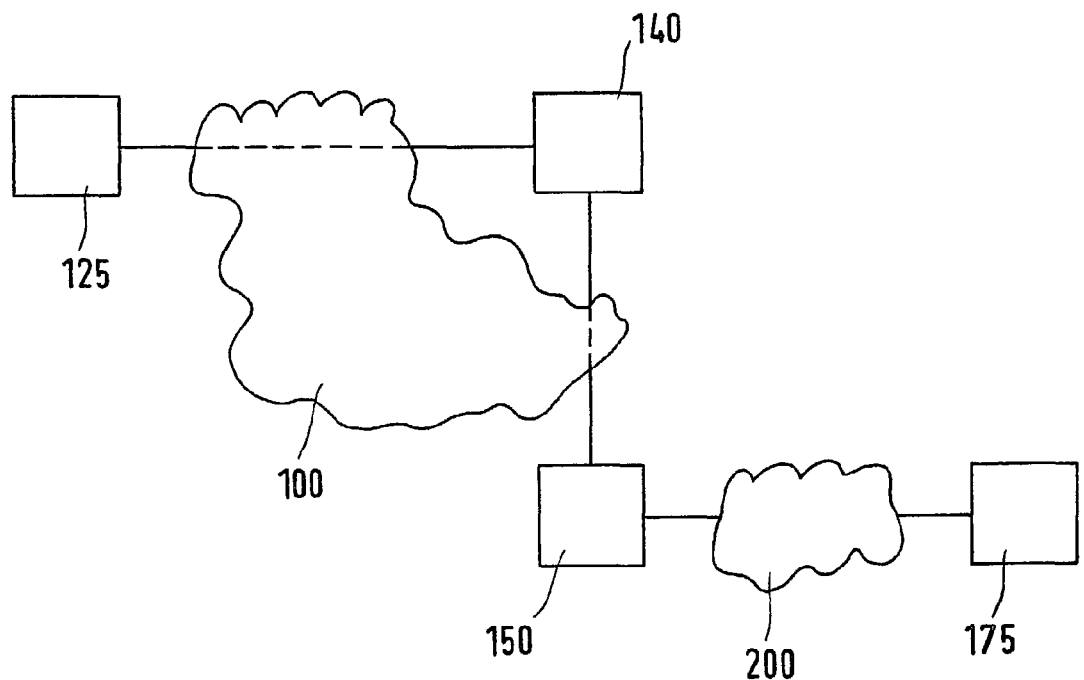
FIG. 1 shows a transmission link from a sender to a receiver.

FIG. 1 shows a sender 125, which sends a short message including an integrated electronic mail message to a first service provider 140 over a first communications network 100. First service provider 140 relays the short message over first communications network 100 to a second service provider 150 of a second communications network 200. Second service provider 150 extracts the electronic mail message from the short message and relays it to a receiver 175 via second communications network 200.

First service provider 140 and second service provider 150 are implemented here as two separate units. However, they may also be integrated into one common unit.

A short message is shown in FIG. 2. Short message 5 is generated by sender 125 of first communications network 100 and is transmitted via first service provider 140 of first communications network 100 to second service provider 150 of second communications network 200 using first communications network 100. A short message service is set up in first communications network 100 for the transmission of such short messages 5. Such a short message service exists, for example, in a first communications network 100, which is configured as a mobile wireless network. Such a mobile wireless network may be, for example, a mobile wireless network according to the GSM standard (Global System for Mobile Communications) or according to the UMTS standard (Universal Mobile Telecommunications System). In the case of the GSM mobile wireless network, SMS short message service is specified, which provides for transmission of SMS short messages between a sender and a receiver, the SMS short messages being limited to text messages having a maximum text length of 160 characters at the present time. If larger text messages are to be transmitted, SMS short message service provides for concatenation of several SMS short messages, i.e., the text message to be transmitted is distributed among multiple SMS short messages.

Short message 5 illustrated in FIG. 2 basically includes a second header 12 and a data portion 50. Second header 12 includes signaling entries and a first destination address for short message 5 to be sent and a source address for short message 5 to be received. The first destination address identifies first service provider 140 of short message 5 in first communications network 100, and the source address identifies sender 125 of short message 5 in first communications network 100. Data portion 50 includes the message to be actually transmitted and thus the useful data, as it is referred to. In SMS short message service, the source address and the first destination address are identified by an MSISDN number (Mobile Subscriber Integrated Services Digital Network) as referred to in "Technical Realization of the Short Message Service (SMS): Point-to-Point (PP)," GSM 03.40 V7.1.0 (1998-11) and "Technical Realization of the Short Message Service (SMS): Point-to-Point (PP)," 3G 23.040 V3.2.0 (1999-10). When short message 5 is transmitted in first communications network 100, a network unit (not shown in FIG. 1) of first communications network 100 addresses first service provider 140 of short message 5 on the basis of the first destination address and replaces it with the source address of sender 125. According to the standard, second header 12 then contains exactly one source address or exactly one first destination address.

Short message 5 according to FIG. 2 includes a first header 11 which is arranged in data portion 50 of short message 5. First header 11 is referred to as user data header in the SMS short message service.

The presence of first header 11 in data portion 50 is indicated by a corresponding signaling entry in second header 12. In the case of SMS short message service, various types of user data headers are specified as referred to in the cited publications "Technical Realization of the Short Message Service (SMS): Point-to-Point (PP)." They are differentiated from one another by an identifying data field 15 in first header 11 according to FIG. 2, where FIG. 2 shows the structure of first header 11 in detail.

Then an electronic mail message 1 may be transmitted in data portion 50 of short message 5. The signaling entry in second header 12 indicates additionally that such an electronic mail message is transmitted with short message 5. This is recognized by first service provider 140 after analyzing second header 12. First service provider 140 therefore relays the short message to second service provider 150 as described above, because the latter functions as the service provider of second communications network 200 which is provided for the transmission of such electronic mail messages and is thus capable of causing electronic mail message 1 to be transmitted in second communications network 200. First service provider 140 thus need not be the service provider of second communications network 200 at the same time, let alone a subscriber of it. Short message 5 including electronic mail message 1 is thus transmitted as described to second service provider 15 of second communications network 200 via first communications network 100, second service provider 150 also being a subscriber of second communications network 200. Electronic mail message 1 is now to be transmitted by second service provider 150 to receiver 175 of second communications network 200. Second communications network 200 may be the Internet, for example, in which case electronic mail message 1 is then an Internet e-mail, for example.

Then several data fields 20, 25, 30, 35 containing address and identification data for transmission of electronic mail message 1 in second communications network 200 are transmitted outside of any header. After analysis of this address and identification data in second service provider 150, electronic mail message 1 may be forwarded to receiver 175 of second communications network 200. To do so, however, second service provider 150 of short message 5 must be notified of how data fields 20, 25, 30, 35 are constructed and whether such data fields 20, 25, 30, 35 are present in data portion 50 at all. This is done on the basis of identifying data field 15 in first header 11, where an identifier indicates how the address and identification data is present in data portion 50 and thus also signals the mere presence of data fields 20, 25, 30, 35. For example, the identifier may indicate that data fields 20, 25, 30, 35 in data portion 50 include addressing and identification of electronic mail message 1 as referred to in "Standard for the Format of ARPA Internet Text Messages" IETF, RFC 822. According to FIG. 2, data fields 20, 25, 30, 35 are shown for RFC 822 addressing according to the cited publication, for example.

First header 11 is preceded by a first length data field 40 which indicates the UDHL (user data header length) of first header 11. First length data field 40 is then followed by identifying data field 15 described above, including an identifier IEI (information element identifier), which in this case indicates that data fields 20, 25, 30, 35 represent RFC 822 addressing. Identifying data field 15 is followed by a second length data field 45 which indicates the IEIDL (information element identifier data length) of a third length data field 46. Third length data field 46 indicates the length of data fields 20, 25, 30, 35 in data portion 50. Data fields 20, 25, 30, 35 are then arranged in data portion 50 outside of any header, as described above. Data fields 20, 25, 30, 35 may be transmitted in data portion 50 of electronic mail message 1, immediately preceding it. Then by the statement of length in third length data field 46, data fields 20, 25, 30, 35 may be unambiguously separated from electronic mail message 1 in data portion 50. This separation may be supported by using a special separation character which is given for this purpose, assuming this separation character is not otherwise used in data fields 20, 25, 30, 35 and electronic mail message 1. Therefore, FIG. 2 shows an area 60 after first header 11 and electronic mail message 1 in data portion 50; this is where data fields 20, 25, 30, 35 are located. Data fields 20, 25, 30, 35 are differentiated by keywords, one keyword is allocated to each data field 20, 25, 30, 35. These keywords are known to second service provider 150. Since there is an unambiguous identification of data fields 20, 25, 30, 35 on the basis of the given keywords, data fields which differ in type and number, depending on the desired application, may be located in data portion 50. According to FIG. 2, four data fields 20, 25, 30, 35 are provided. However, there may also be more or fewer. For example, a first data field 20 is a destination address data field which includes a second destination address of electronic mail message 1 and thus identifies receiver 175 of electronic mail message 1 in second communications network 200. Destination address data field 20 is therefore indispensable for forwarding electronic mail message 1 in second communications network 200, but it may also be located at any desired location in area 60 of data fields 20, 25, 30, 35 on the basis of the allocated keyword, because it is identified unambiguously by second service provider 150 on the basis of the keyword. The same thing is also true of all other data fields. A second data field 25 in area 60 of data fields 20, 25, 30, 35 may be a source address data field and may include the source address of electronic mail message 1, so that sender 125 of electronic mail message 1 is identifiable by receiver 175 of electronic mail message 1 in second communications network 200.

A third data field 30 in area 60 of data fields 20, 25, 30, 35 may be a title data field which includes a subject or title of electronic mail message 1.

A fourth data field 35 in area 60 of data fields 20, 25, 30, may be a name data field which includes the name of sender 125 of electronic mail message 1, but not in the form of the source address, but instead in the form of a first and last name, for example, i.e., a personal name.

The allocation of data fields to keywords may be as follows, for example: the keyword "to" is assigned to the destination address data field. The keyword "from" is assigned to source address data field 25. The keyword "subject" is assigned to title data field 30. Name data field 35 is not used in this example.

An example of the structure of data fields 20, 25, 30 in area 60 is described below. Second header 12 contains a signaling entry TP-UDHI (transfer protocol user data header identification), which indicates whether first header 11 and thus electronic mail message 1 is included in short message 5. If this is the case, TP-UDHI is set at 1, otherwise TP-UDHI is set at 0. First header 11 may have the following structure, for example. In first length data field 40, length UDHL of first header 11 is set at 3 in the hexadecimal system. Identifier IEI is set at 20 in the hexadecimal system in identifying data field 15, signaling by this value the presence of data fields 20, 25, 30 in area 60 and the described RFC 822 address according to a corresponding allocation table. Length IEIDL is set at one in the hexadecimal system in second length data field 45, thus indicating that the length of third length data field 46 amounts to one character and therefore one byte and thus 8 bits, so that third length data field 46 may indicate a maximum of 255 characters for the length of data fields 20, 25, 30. The length of data fields 20, 25, 30 in third length data field 46 in this example is set at a value of 37 in the hexadecimal system. For the case when the length of data fields 20, 25, 30 is greater than 255, at least two bytes are necessary for the length statement in third length data field 46. Accordingly, then the entry in second length data field 45 is to be set at two or more. As an alternative, third length data field 46 may be omitted if a separation character is stipulated between area 60 including data fields 20, 25, 30 and electronic mail message 1. According to RFC 822 addressing, this may be a blank line, for example. If third length data field 46 is not necessary, second length data field 45 is set at zero accordingly.

In destination address data field 20, keyword "to" including the subsequent character string of 27 characters references a second destination address as an Internet address for electronic mail message 1, which is an Internet e-mail in this example:

To=Gunnar.Schmidt@Bosch.com

In source address data field 25, keyword "from" references a source address, which is also an Internet address, for identification of sender 125 of electronic mail message 1, the following character string of 23 characters is formed in source address data field 25:

From=+49xxxyyyyy@zzz.de

The source address is obviously an Internet e-mail address which includes a telephone number and is not personalized. Personalized identification of sender 125 of electronic mail message 1 is performed by using name data field 35 as described above, but that is not provided in this example.

In this example, a character string of 12 characters is provided in title data field 30, in which keyword "subject" references the title of electronic mail message 1 as follows:

Subject=test

No additional data fields are provided in area 60 in this example. Three data fields 20, 25, 30 used in this example include a total of 62 characters, which may be binary coded with 7 bits, for example, thus requiring a total of 55 bytes for coding. The number 55 in the decimal system corresponds to the number 37 in the hexadecimal system and thus corresponds to the value provided in third length data field 46.

Since data fields 20, 25, 30 including the address and identification data are in the actual message part of short message 5, it may be possible to use, for example, 7-bit coding of the characters as referred to in "Alphabets and language-specific information," GSM 03.38 and 3GPP 23.038.

In the example described here, individual data fields 20, 25, 30 are identified unambiguously not only through keywords, but also separately from one another. This means that the content of each data field 20, 25, 30 must not contain any keywords. However, this requirement is irrelevant if each data field 20, 25, 30 is terminated with a separation character, and it has been stipulated that the keyword identifying the respective data field must be placed at the beginning of this data field, so that after a separation character, the first following keyword identifies a new beginning data field and all the following keywords up to the next separation character are not interpreted as identifying a new data field. Then the character string for destination address data field 20 may be as follows, starting from the above example:

To=Gunnar.Schmidt@Bosch.com<CR>

<CR>, i.e., "carriage return" has been selected as the separation character here. This lengthens the character string to a total of 28 characters.

Also as an alternative to the example described here, the characters may be binary coded in 8 bits. This would increase the supply of characters but would further reduce the number of characters for electronic mail message 1.

In the example described here, fewer than 100 characters remain for actual electronic mail message 1 in data portion 50 of short message 5, if based on a short message 5 according to SMS standard and the current limit of 160 characters per short message in this SMS standard.

7-bit binary coding is used for the keywords of the RFC 822 address described here to save on characters. This may be accomplished by using a given reference table, which is known in sender 125 and in second service provider 150 and may be as follows, for example:

| Keyword | Binary code (7 bit) |
| --- | --- |
| To: | <0000000> |
| From: | <0000001> |
| Cc: | <0000010> |

| Keyword | Binary code (7 bit) |
|---|---|
| Bcc: | <0000011> |
| Subject: | <0000100> |
| ... | ... |

In addition to the keywords "to," "from" and "subject" already described above, this table also contains the following additional keywords: "cc" and "bcc." Moreover, the table indicates that other keywords may also be provided in addition to those described above. For each keyword used in area 60, a data field is provided in area 60 in the manner described here. Keywords "cc" and "bcc" identify additional destination addresses to which electronic mail message 1 is to be transmitted in second communications network 200 in addition to the second destination address given under the keyword "to."

As an alternative to the example described here, the keywords may also be binary coded with 8 bits.

The following would then be obtained by coding the keywords in area 60 according to the example described above:

In first length data field 40, UDHL would be set at 3 in the hexadecimal system, just as before. In identifying data field 15, IEI would still be set at 20 in the hexadecimal system, to reference the RFC 822 addressing, just as before. In second length data field 45, IEIDL would be set at one in the hexadecimal system. The length of data fields 20, 25, 30 in area 60 is then set at 2b in the hexadecimal system in third length data field 46. By coding the keyword "to" according to the table with the character <0000000>, the character string in destination address data field 20 would now include 25 characters and would have the following aspect:

<0000000>Gunnar.Schmidt@Bosch.com

By coding the keyword "from" with the character <0000001> according to the table, source address data field 25 would then include a character string of 19 characters and would appear as follows:

<0000001>+41xxxyyyyy@zzz.de

By coding the keyword "subject" with the character <0000100> according to the table, title data field 30 would then include a character string of five characters and would appear as follows:

<0000100>test

There are now 49 characters for data fields 20, 25, 30, which would require 43 bytes in binary coding with 7 bits each, the number 43 in the decimal system corresponding to the number 2b in the hexadecimal system and thus corresponding to the value provided in third length data field 46.

This makes it possible to save on characters which may then be made available for electronic mail message 1.

A value of 3 for the UDHL indicates that a maximum of three bytes, i.e., 24 bit positions, are available for first header 11 in data portion 50, i.e., for first length data field 40, second length data field 45, third length data field 46 and identifying data field 15.

At least one third header 13 is transmitted with short message 5 in addition to first header 11, identifying electronic mail message 1 as part of complete electronic mail message 1 concatenated by transmission of multiple short messages. The order of first header 11 and third header 13 may also be reversed. Only second header 12 should stand at the beginning of short message 5. Other headers may also be added to short message 5 in any desired order with first header 11 and optionally third header 13, and second header 12 must always stand at the beginning of short message 5.

Third header 13 is optional. FIG. 3 shows on the basis of the example according to FIG. 2 a short message 5 including integrated third header 13. The same reference numbers denote the same elements as in FIG. 2. The structure of the short message according to FIG. 3 corresponds to the structure described for the example according to FIG. 2, the difference being that third header 13 in the example according to FIG. 3 is now also arranged in short message 5 between first header 11 and area 60. In any case, third header 13 differs from first header 11 by the identifier in identifying data field 15. On the basis of this identifier, second service provider 150 may differentiate first header 11 from third header 13.

Third header 13 must also contain an identifier which identifies the complete electronic mail message. Then at second service provider 150, all electronic mail messages received via short messages are concatenated to form the complete electronic mail message, which are referenced by the identification of this complete electronic mail message and are transmitted in this form as concatenated complete electronic mail message to receiver 175 in second communications network 200, addressed according to second destination address in destination address data field 20. Third header 13 may also contain a sequence number which indicates the location of electronic mail message 1 of respective short message 5 in the complete concatenated electronic mail message, so that several electronic mail messages identified in this manner may be concatenated in the correct order in second service provider 150. A separate header may be provided in short message 5 for the identification of the complete electronic mail message and for the identification of the sequence number of the respective electronic mail message and to differentiate them with a corresponding identifier in identifying data field 15.

By analysis of data fields 20, 25, 30, 35, second service provider 150 is capable of extracting from short message 5 electronic mail message 1 from data portion 50, because first header 11 and optionally other headers of data portion 50, such as third header 13 and finally also area 60 always precede the useful data in data portion 50 and include at least one length data field from which their length may be determined, and in the case of first header 11, the length of area 60 may also be determined. Length information regarding all headers 11, 12 and data fields 20, 25, 30, 35 present in data portion 50 may be provided only in first header 11 via length data fields, so that no corresponding length data fields are necessary in the additional headers of data portion 50 and area 60. First length data field 40 of first header 11 may give the total length of all headers 11, 13 of data portion 50. Then in addition, the information required for the addressing and identification of electronic mail message 1 is obtained from area 60 including data fields 20, 25, 30, 35, this information is necessary for transmission of extracted electronic mail message 1 in second communications network 200 to receiver 175 addressed there and identification of sender 125 at receiver 175. For simple transmission of electronic mail message 1 to receiver 175 of second communications network 200, of the data fields that may be used, only destination address data field 20 in area 60 is absolutely essential. Source address data field 25 and name data field 35 only identify sender 125, and title data field 30 only provides the title and thus the identification of electronic mail message 1 itself. From third header 13, the presence of which is also referenced by a corresponding signaling entry in second header 12, second service provider 150 may recognize whether electronic mail message 1 is part of a complete electronic mail message to be concatenated. On the basis of another header (not shown in FIG. 2), the presence of which is also referenced by a corresponding signaling entry in second header 12, second service provider 150 may recognize the position of electronic mail message 1 of short message 5 in the complete electronic mail message to be concatenated, unless this information is already contained in third header 13.

According to the position determined for electronic mail message 1 in the complete electronic mail message to be concatenated, second service provider 150 may insert electronic mail message 1 of short message 5 into the proper location of the complete electronic mail message to be concatenated.

The exemplary method according to the present invention is not limited to the SMS short message service in the GSM mobile wireless network, but instead it may also be used for any desired short message services in which electronic mail messages are transmitted with short messages, and the electronic mail message need not be Internet e-mail.

What is claimed is:

1. A method of transmitting internet electronic mail messages using a short message service, the method comprising:
    transmitting with a short message an electronic mail message and address data and identification data, for transmission of the electronic mail message via the internet, in a mobile telephone network;
    transmitting a first header with the short message, the first header including signaling of at least one data field including the address data and identification data;
    transmitting a second header with the short message, the second header indicating the presence of the first header; and
    transmitting, outside of any header, the at least one data field within a data portion of the short message;
    identifying the at least one data field by a keyword for transmission in the data portion; and
    transmitting with the short message at least one third header that identifies the electronic mail message as part of a complete electronic mail message concatenated by transmission of multiple short messages;
    wherein the first header information is placed in front of the at least one data field having the address data and identification data and transmitted with the short message.

2. The method of claim 1, wherein keywords are transmitted in coded form.

3. The method of claim 1, wherein an identifying data field includes the signaling of the at least one data field, and is transmitted with the first header.

4. The method of claim 3, wherein the identifying data field indicates a form of the at least one of address data and identification data.

5. The method of claim 1, wherein the at least one data field in the data portion of the electronic mail message is transmitted immediately before the electronic mail message.

6. The method of claim 1, wherein at least one destination address data field, which includes a destination address of the electronic mail message, is transmitted in the data portion.

7. The method of claim 1, wherein a source address data field, which includes the source address of the electronic mail message, is transmitted in the data portion.

8. The method of claim 1, wherein a title data field, which includes a title of the electronic mail message, is transmitted in the data portion.

9. The method of claim 1, wherein a name data field, which includes a name of a sender of the electronic mail message, is transmitted in the data portion.

10. The method of claim 1, wherein an end of the at least one data field is identified by a separation character.

11. The method of claim 1, wherein a length data field is transmitted with the first header to indicate a length of the at least one data field.

12. The method of claim 1, wherein the at least one data field is transmitted so that it is separated from the electronic mail message by a separation character.

13. The method of claim 1,
    wherein keywords are transmitted in coded form,
    wherein an identifying data field includes the signaling of the at least one data field, and is transmitted with the first header,
    wherein an end of the at least one data field is identified by a separation character,
    wherein a length data field is transmitted with the first header to indicate a length of the at least one data field,
    wherein the at least one data field is transmitted so that it is separated from the electronic mail message by a separation character,
    wherein the identifying data field indicates a form of the at least one of address data and identification data.

14. The method of claim 13, wherein the at least one data field in the data portion of the electronic mail message is transmitted immediately before the electronic mail message.

15. The method of claim 13, wherein at least one destination address data field, which includes a destination address of the electronic mail message, is transmitted in the data portion.

16. The method of claim 13, wherein a source address data field, which includes the source address of the electronic mail message, is transmitted in the data portion.

17. The method of claim 13, wherein a title data field, which includes a title of the electronic mail message, is transmitted in the data portion.

18. The method of claim 13, wherein a name data field, which includes a name of a sender of the electronic mail message, is transmitted in the data portion.

19. The method of claim 13, wherein the at least one data field in the data portion of the electronic mail message is transmitted immediately before the electronic mail message, and wherein at least one destination address data field, which includes a destination address of the electronic mail message, is transmitted in the data portion.

20. The method of claim 19, wherein a title data field, which includes a title of the electronic mail message, is transmitted in the data portion.

21. The method of claim 19, wherein a name data field, which includes a name of a sender of the electronic mail message, is transmitted in the data portion.

22. The method of claim 13, wherein a source address data field, which includes the source address of the electronic mail message, is transmitted in the data portion, and wherein the at least one data field in the data portion of the electronic mail message is transmitted immediately before the electronic mail message.

23. The method of claim 22, wherein a title data field, which includes a title of the electronic mail message, is transmitted in the data portion.

24. The method of claim 22, wherein a name data field, which includes a name of a sender of the electronic mail message, is transmitted in the data portion.

25. A method of transmitting internet electronic mail messages using a short message service of a mobile telephone network, the method comprising:
    transmitting with a first short message an internet electronic mail message, wherein said short message includes a message header portion and a message data portion, the message data portion includes a user data header portion, a data area and a message portion and wherein said message header portion includes a signaling entry indicating that an electronic mail message is being transmitted with the short message, said data area includes data fields representing addressing information in accordance with RFC 822 and said user data header portion includes a first data field indicating that said data area contains fields representing addressing information in accordance with RFC 822, a second data field indicating a length of said fields representing addressing information and a third data field indicating a length of said second data field, and wherein said data area is immediately before said message portion, wherein said electronic mail message is transmitted with a plurality of short messages, said plurality of short messages comprising said first short message, a final short message and optionally one or more intermediate short messages, and wherein each of said first, final and intermediate short messages includes information for enabling a receiver to concatenate said short messages in a correct order.

26. The method according to claim 25, wherein said mobile telephone network is a GSM mobile phone network.

27. The method according to claim 25, wherein said mobile phone network is a UMTS mobile phone network.

28. The method according to claim 25, wherein each of said first, final and intermediate short messages include information for enabling a receiver to concatenate said short messages in a correct order, and wherein said mobile telephone network is a GSM mobile phone network.

29. The method according to claim 25, wherein each of said first, final and intermediate short messages include information for enabling a receiver to concatenate said short messages in a correct order, and wherein said mobile phone network is a UMTS mobile phone network.

* * * * *